United States Patent [19]
Howlett

[11] 4,112,412
[45] Sep. 5, 1978

[54] DIGITAL SEISMIC TELEMETRY SYSTEM

[75] Inventor: Donald L. Howlett, Houston, Tex.

[73] Assignee: Texaco Inc., New York, N.Y.

[21] Appl. No.: 749,646

[22] Filed: Dec. 10, 1976

Related U.S. Application Data

[63] Continuation of Ser. No. 530,913, Dec. 9, 1974, abandoned.

[51] Int. Cl.² ............................................. G01V 1/00
[52] U.S. Cl. .......................... 340/15.5 TS; 179/15 BV
[58] Field of Search ...................... 364/900 MS File; 179/15 BV; 340/15.5 TS

[56] References Cited

U.S. PATENT DOCUMENTS

| | | | |
|---|---|---|---|
| 3,534,264 | 10/1970 | Blasbalg et al. | 325/15 |
| 3,562,504 | 2/1971 | Harris | 235/154 |
| 3,665,417 | 5/1972 | Low et al. | 179/15 BV X |
| 3,806,864 | 4/1974 | Broding et al. | 340/15.5 TS |
| 3,876,838 | 4/1975 | Boxall | 179/15 BW |

Primary Examiner—Maynard R. Wilbur
Assistant Examiner—T. M. Blum
Attorney, Agent, or Firm—Carl G. Ries; Thomas H. Whaley; William J. Beard

[57] ABSTRACT

A digital seismic telemetry system for recording seismic data from a plurality of seismic signal detectors positioned at selected detector stations. The system includes a plurality of remote units, each of which is positioned at a distinct detector station to receive seismic data from the detector at that station. The remote units each include a storage device for storing seismic data from the detector in digital form, and a remote transmitting unit for transmitting the stored seismic data from the storage device to a master recording unit for recording. A master control unit operably connected with each of the remote units controls the acquisition and the transmission of seismic data from the remote units to the master recording unit and limits the amount of data transmitted at any given time to optimize the bandwidth requirements for the data transmission.

5 Claims, 2 Drawing Figures

DIGITAL SEISMIC TELEMETRY SYSTEM

BACKGROUND OF THE INVENTION

The field of this invention is seismic telemetry systems.

In seismic survey operations, a seismic signal is imparted to the land surface within the survey area at a shot point. The seismic signal travels from the shot point downwardly from the land surface until it is at least partially reflected by geological strata beneath the land surface. A plurality of seismic signal detectors or detector groups, each of which is positioned at a distinct detector station, senses the reflected seismic signal at that station and produces an electrical output signal corresponding to the detected seismic signal. The outputs of the detectors or detector groups are sampled for a period of time subsequent to sending the seismic signal to the land surface, and these outputs are recorded by a seismic recorder for subsequent processing and interpretation. The shot point and detector stations are then relocated and the process is repeated until a sufficient amount of data has been collected within the survey area.

In many survey systems, each of the detectors or detector groups was electrically connected to the seismic recorder by a cable which included a conductor running from each detector or detector group to the recorder. When the number of detectors to be used with the system was increased, the number of conductors which had to be provided in the cable also had to be increased. As a consequence, the cables were often quite complex in structure and difficult to maintain and repair. Further, when seismic survey operations had to be conducted in areas having a rugged terrain, the cables were quite difficult to handle and were often damaged when they were handled. As a result, considerable expenditures of time, money, and manpower were required to maintain and repair these cables.

Known seismic telemetry systems eliminated the necessity of employing a cable by providing devices which could transmit seismic data directly from the detectors to the seismic recorder. However, the known seismic telemetry systems were not widely used in some areas of the world. With these systems, an extremely large amount of seismic data was transmitted to the recorder during the relatively short sampling period. A large number of channels were used to transmit the voluminous data within this period of time, necessitating the use of transmission equipment with extremely broad bandwidths. This, of course increased the cost of the equipment employed with such seismic telemetry systems. Further, in many areas of the world, licenses to broadcast data over such broad bandwidths could not be obtained from the local authorities. As a result, these known telemetry systems could not be used at many survey locations.

SUMMARY OF THE INVENTION

It is an object of this invention to provide a new and improved digital seismic telemetry system.

The system of the present invention includes a plurality of remote units, a master recording unit, and a master control unit. Each of the remote units is positioned at a distinct detector station and operably connected to one or more seismic signal detectors to receive analog seismic signals from the detector or detectors. With one detector operably connected to a remote unit, the remote unit has a single channel, but with a plurality of detectors operably connected to a remote unit, the remote unit has a plurality of channels and is provided with a multiplexer to permit simultaneous reception of analog seismic signals from each of the detectors. Field conditions under which the apparatus of the present invention is used influence the desirability of employing either single or multiple channel remote units. Each of the remote units also includes a converter for converting the output of the detector to digital form, a remote memory device for storing the digital seismic data, and a remote transmitter for transmitting the stored seismic data to the master recording unit.

The master control unit includes a control signal generator for generating control signals which are transmitted to the remote units by a control transmitter. Each of the remote units includes a remote receiver to receive these control signals from the control transmitter and a remote command unit for generating command signals within the remote unit to control that remote unit in response to the control signals from the master control unit. Thus, the master control unit controls each of the remote units at the various detector stations.

The control of the remote units by the master control unit and the storage of seismic data in the remote memory devices of each remote unit make it possible to control the number of remote units transmitting seismic data to the master recording unit at any given time. Because the seismic data from the detectors is stored in the remote memory devices of the remote units, it is possible to delay transmission of the seismic data from any of the remote units to the master recording unit. Thus, it is not necessary that the data from all the remote units be transmitted to the master recording unit at one time. Rather, the data may be transmitted from the remote units individually or in groups consisting of a small number of remote units. Further, the rate at which data is transmitted from any of the remote units can be relatively low. Because the data is stored in the remote storage registers, it is readily retrievable at any given rate and may also be transmitted at any suitable retrieval rate. Thus, the rate at which the data is transmitted and the amount of data transmitted to the master recording unit at any given time are selected to optimize the bandwidth requirements of the seismic telemetry system of the present invention. The narrower bandwidth requirements obtainable make it much more likely that a license to transmit data can be obtained from local authorities, thereby eliminating the need to resort to seismic survey apparatus employing cumbersome cables connecting seismic detectors to seismic recorders.

DETAILED DESCRIPTION OF THE PREFERRED EMBODIMENT

Figure 1:
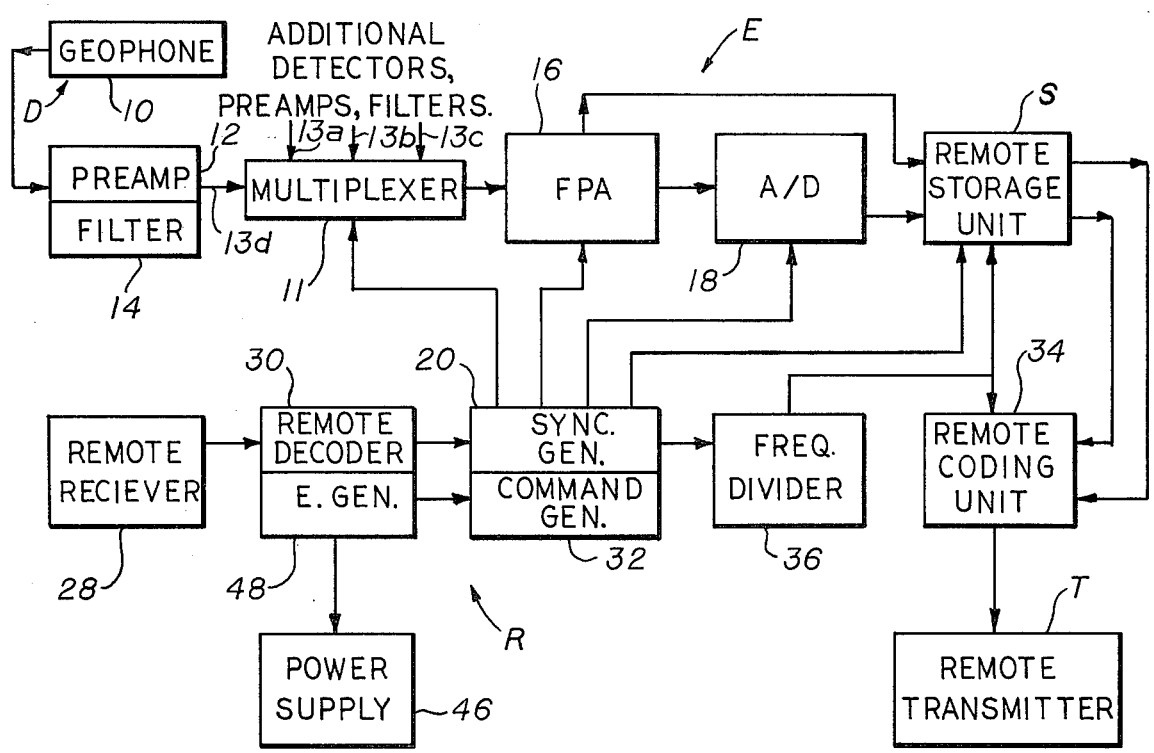
FIG. 1 is a functional block diagram of a remote unit of the present invention.
Figure 2:
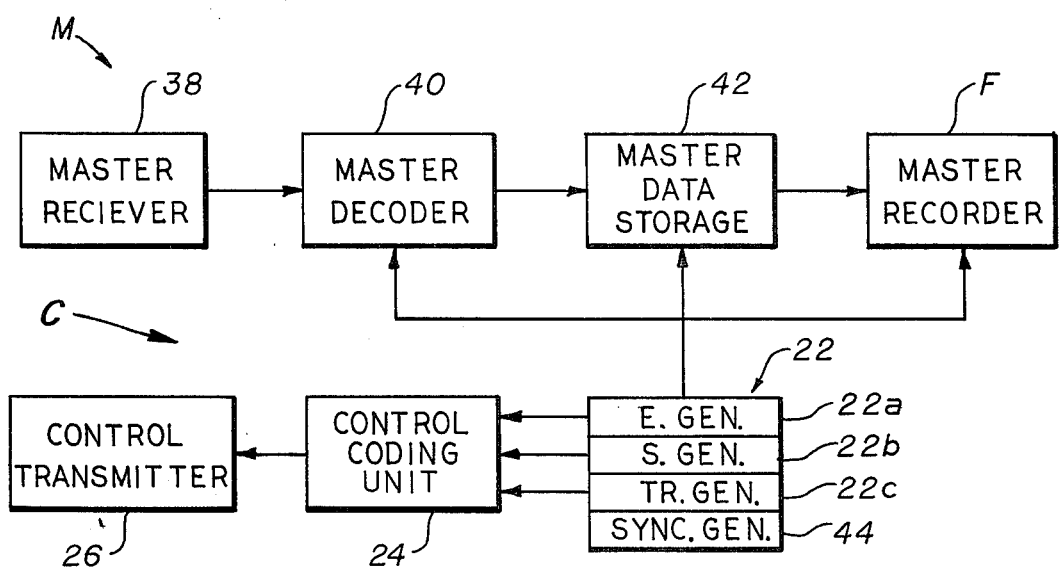
FIG. 2 is a functional block diagram illustrating both the master recording unit and the master control unit of the present invention.

In the drawings, the digital seismic telemetry system of the present invention includes a plurality of remote units R (FIG. 1), a master recording unit M and a master control unit C (FIG. 2). Each of the remote units R is preferably positioned at one or more distinct detector stations and is operably connected to seismic signal detector D. The detector D senses seismic signals and produces an electrical output signal corresponding to the detected seismic signal. The output signal from detector D is converted to digital from by converter E, and the resultant digital seismic data is stored in a remote storage unit S, which may be any suitable memory device, such as an integrated circuit memory, cassette recorder or the like. In this manner, seismic data for each of the detector stations is converted to digital form and stored in each of the remote units R. A remote transmitter T is also provided with each of the remote units R to transmit seismic data from storage unit S to the master recording unit M where the seismic data is recorded by recorder F. Transmission of the seismic data from each of the remote units R is controlled by a master control unit C. After the data from each of the remote units R has been recorded by recorder F, the detectors D and remote units R may be moved to new detector stations where additional seismic data is collected.

Considering the invention in more detail, the remote units R of digital seismic telemetry system are preferably identical in structure. Accordingly, only one of the remote units is illustrated in the drawings (FIG. 1), but the description of the illustrated remote unit R is applicable to each of the plurality of remote units included in the system. Further, since the remote units R are formed with conventional electrical circuitry elements, the remote unit R is illustrated in functional block diagram form.

Each of the remote units R is operably connected to one or more of a plurality of detectors D and is positioned with its associated detector or detectors during seismic survey operations. Although a variety of seismic signal detectors D may be used with the present invention, in the preferred embodiment of the present invention, detector D includes a geophone 10 or a group of such geophones. The geophone 10 is a conventional geophone which senses seismic signals and produces an electrical output signal corresponding in magnitude to the magnitude of the detected seismic signals.

The output signal of detector D is conveyed to a preamplifier 12 and filter 14. When detector D includes a plurality of geophones 10, the geophones are electrically to preamplifier 12, either in series or parallel, depending upon desired seismic detection techniques. However, whether detector D includes either one or a plurality of geophones 10, the electrical output signal of detector is amplified by preamplifier 12, a conventional preamplifier. Filter 14, a conventional bandpass filter, then eliminates extraneous signals from the output signal of preamplifier 12.

The amplified, filtered output of detector D is in analog form. This analog output from the detector is conveyed to a remote converter means E of the remote unit with which the detector is associated. The converter E converts the analog output from the detector to digital form. When only a single detector D is operably connected with a remote unit R, the output of detector D may be conveyed directly to the converter E of that remote unit. However, where a plurality of detectors D are connected to a remote unit R, a conventional multiplexer 11 is provided between the filters 14 of each detector D and the converter E of the remote unit R. Multiplexer 11 receives the outputs of filter 14 associated with each detector at a plurality of input terminals 3a-13d, and performs conventional multiplexing to convert the plurality of detector signals into an analog signal suitable for processing by converter E.

In the preferred embodiment of system, converter means E includes floating point amplifier 16 and an analog to digital converter 18. The output of seismic detector D is thus conveyed to floating point amplifier 16 where it is amplified. The floating point amplifier 16 provides two distinct outputs. The first output is an analog electrical signal ranging between two predetermined voltage levels. This output of the floating point amplifier 16 is conveyed to analog to digital converter 18 where it is converted to digital form and subsequently conveyed to remote storage unit S. The second output of floating point amplifier 16 is a digital signal representing the gain applied to the analog signal or exponent of a particular number base associated with the first output of floating point amplifier 16. This second output is conveyed directly to remote storage unit S. Thus, converter means E amplifies the output of seismic detector D, converts the output to digital form, and conveys the digital data to remote storage unit S in parallel data form. Remote data storage unit S is a conventional digital memory device capable of storing digital data in parallel form. The digital seismic data from converter E is stored in remote storage unit S.

To synchronize the functions of converter means E and remote storage unit S, remote unit R includes a synchronization signal generator or clock 20 which may be a conventional digital clock circuit. The synchronization generator 20 generates a pulsed signal having a fixed number of pulses per unit of time and this synchronization signal is conveyed to floating point amplifier 16, analog to digital converter 18, and data storage unit S so that digital data is supplied to remote storage unit S at the same rate that the remote storage unit S stores the digital data. In addition, it should be noted that the synchronization signal determines the rate at which remote unit R samples the output of seismic detector D. It is desirable to have a rapid sampling rate so that the data sampled, converted, and stored by the remote units approximates, as nearly as possible, the analog output signal of the seismic signal detector D. Accordingly, the synchronization signal from synchronization generator 20 preferably has a large number of pulses per unit of time. It is also preferable that the synchronization generators in all of the remote units R operate at the same rate and that each of the remote units R samples seismic data at the same instant of time.

Initiation of the sampling of data from seismic decoder D and other functions of the remote unit R are controlled by the master control unit C. As explained in more detail hereinbelow, master control unit C includes a plurality of control signal generators 22 for generating control signals which are transmitted to the remote units R. Each of the control generators 22 is a logic network capable of generating command signals and operably connected to a control coding unit 24. A control coding unit 24 consists of conventional digital coding circuitry for digitally coding the control signal from generators 22 so that the control signal contains an address header identifying the remote unit and followed by a coded command. Any conventional coding system, such as the Manchester system, may be used and digital coding circuitry conventionally employed with the Manchester system may be used in control coding unit 24. The coded control signal from coding unit 24 is conveyed to a control transmitter 26 which transmits the control signal to the remote units R. A remote receiver 26 provided in each of the remote units R receives the control signal and conveys the signal to a remote decoder 30. Decoder 30 consists of conventional decoding circuitry compatible with the circuitry in control unit 24. The circuitry must, of course, employ the same coding system, such as the Manchester system, employed in control coding unit 24. If the coded address header of the control signal from master control unit C indicates that the received control signal is not intended for the particular remote unit R with which a particular remote decoder 30 is associated, the control signal is not passed by the remote decoder 30. If, however, the address header indicates that the control signal is intended for that remote unit unit R, the control signal is passed to a command signal generator 32 of the remote unit R. The command signal generator 32 also includes conventional decoding circuitry compatible with that found in control coding unit 24 and may be integrally formed with remote decoder 30 if desired. However, command signal generator 32 additionally includes a conventional digital pulse generator for generating command signals in response to and in accordance with the controlled signals from master control unit C. As explained in more detail below, the command signals are conveyed to various elements of the remote unit R to cause the remote unit to function in accordance with the control signals from master control unit C.

One of the functions of the remote units R controlled by the master control unit C is initiation and cessation of the sampling of seismic detector outputs D by the remote units R. The output of seismic detectors D are sampled during a sampling period which commences at the time when a seismic signal generator (not shown) imparts a seismic signal to the land surface of the survey area. The sampling ends at some predetermined time, typically on the order of five seconds, thereafter.

To initiate sampling by the remote units R, a sampling generator 22b generates an initialization signal signal which is conveyed to control coding unit 24 which codes the sampling initialization signal with an address header applicable to all of the remote units R. The initialization signal may be derived from the seismic energy source itself, for example. The coded sampling initialization control signal is then transmitted to the remote units R by control transmitter 26 and received in each of the remote units R by the remote receiver 28.

The remote decoders 30 in each of the remote units R pass the initiation control signal to the command signal generator 32. The command signal generator 32 then generates a command signal which is conveyed to converter means E and remote storage unit S to activate those elements of the remote units R. Upon activation of the converter E and the storage unit S, sampling of the output from seismic detector D commences. Data is obtained from seismic decoders D, converted to digital form by converter means E, and stored in the remote storage unit S of each of the remote units R. This sampling and storage of data continues until sample generator 22b generates a sampling cessation control signal which is transmitted to and received by each of the remote units R in the same manner as the initiation control signal was transmitted and received. When the sampling cessation signal is conveyed to the command signal generators 32 of each of the remote units R, the command signal generator generates a sampling cessation command signal which is conveyed to the converter means E and the remote storage unit S to deactivate those elements in each of the remote units R.

The digital seismic data stored in each of the remote storage units S during a sampling interval remains in those storage units S until the data is retrieved from the storage units S and transmitted to the master recording unit M. Transmission of the data from the storage unit S in each of the remote units R is controlled by the master control unit C. A transmission generator 22c generates a transmission initiation control signal which is conveyed to control coding unit 24 for coding. If desired, the transmission initiation control signal could be given an address header applicable to all of the remote units R. However, as explained in more detail hereinbelow, this results in each of the remote units R transmitting its data to master recording means M at the same time. Preferably, control coding unit 24 codes the transmission initiation control signal so that it is applicable to one or a small group of remote units R. In this manner, the data transmitted to the master recording means M during a given period of time is minimized and, consequently, the bandwidth requirements for the data transmission are reduced.

In any event, the transmission initiation control signal is coded by a control coding unit 24 and transmitted to the remote unit R by control transmitter 26. The control signal is received by remote receiver 28 in each of the remote units R and conveyed to the remote decoder 30 of the remote units R. If the address header coding of the control signal is applicable to the particular remote unit, the control signal is passed to command generator 32 which generates a transmission command signal. This transmission command signal is conveyed to the remote storage unit S and a remote coding unit 34. Upon receipt of this command signal, the remote storage unit S conveys stored digital data to the remote coding unit 34. As noted above, the remote storage unit S stores the seismic data in parallel digital form. The data is transmitted from the remote storage unit S to the remote coding unit 34 in parallel form. The remote coding unit 34, which may consist of conventional parallel shift registers and logic circuits, converts the seismic data from parallel digital form to serial digital form, puts in parity bits, synchronization bits and other information which will allow the master receiver to identify bit boundaries, work boundaries and to detect possible errors. This unit then conveys the seismic data to remote transmitter T in serial form. The remote transmitter T, in turn, transmits the digital seismic data to master recording unit M, which may be any suitable digital signal storage apparatus.

To insure that the coding function of remote coding unit 34 is synchronized with the conveyance of digital seismic data from remote storage unit S, a synchronization signal is provided to the remote storage unit S and the remote coding unit 34 from a frequency divider 36. Frequently divider 36 is a conventional digital frequency divider which receives a pulse synchronization signal from synchronization generator 20 and divides the frequency of that signal. This divided frequency signal determines the rate at which data is conveyed to the remote coding unit 34, the rate at which the coded digital seismic data is transmitted to remote transmitter T and, consequently, the rate at which seismic data is transmitted from the remote unit R to the master recording means M. To reduce the bandwidth required to transmit the seismic data to the master recording unit M, it is desirable to have the data transmitted at a relatively low rate. In most instances the data transmission rate is significantly lower than the rate at which seismic data from all of a group of remote units is sampled, converted and stored. These later functions are preferably accomplished at a rate corresponding to a "real time" operation. That is, the sampling, conversion, and storage of seismic data from seismic detector D are preferably accomplished at a time and at a rate approximating the rate at which changes in the output signal of the seismic detector D. However, once the data is stored in the remote storage units S, it is retrievable at any desired time and at any suitable rate. The transmission rate of the system is optimized for the assigned operating frequency and bandwidth.

Data transmitted from the remote transmitters T is received at the master recording unit M by a master receiver 38. The master receiver 38 passes the digital seismic data to a master decoder 40. The master decoder 40, which may consist of conventional parallel shift registers, performs substantially the inverse function of remote coding unit 34. That is, the master decoder 40 converts the digital seismic data from the remote unit R from serial form to parallel digital form, and detects and decodes parity bits, synchronization bits, and other information coded into the data to identify bit boundaries, word boundaries, and to detect possible errors. The master decoder 40 then conveys the digital seismic data in this parallel form to a master storage unit 42 which may be a conventional storage register capable of storing digital data in parallel form. The reception, decoding and storage of data by master receiver 38 decoder 40, and storage unit 42 are synchronized with respect to each other and with respect to the signal received from remote unit R. A synchronization signal generated by synchronization generator 44 and simultaneously conveyed to the recorder 38, decoder 40 and storage unit 42 accomplishes this synchronization in a conventional manner.

The data remains in the master storage unit 42 until a control signal from transmission generator 22c is provided to the storage unit 42 and the master recorder F. The master recorder F may be a conventional magnetic tape seismic recorder for recording seismic data in parallel digital form. To synchronize the supply of data from storage unit 42 and the recording of the data by recorder F, synchronizing generator 44 is provided to additionally supply a synchronizing pulsed signal to the master storage unit and the recorder F.

The duration of transmission of seismic data from any one of the remote units R may be controlled in a number of ways. Since the duration of the sampling period for each of the remote units R is known, command signal generator 32 may be provided with a conventional digital delay circuit which produces a deactivating pulsed signal at a predetermined time subsequent to the receipt of the transmission initiation signal from master control means C. Alternatively, transmission generator 22c may produce a transmission cessation pulse which is coded in control unit 24 and transmitted to the remote unit R which is in the process of transmitting seismic data. Upon receipt of the transmission cessation control signal from master control unit C, the command signal generator 32 generates a transmission cessation signal which is conveyed to the remote storage unit S and the remote coding unit 34 to deactivate those units.

Following the end of transmission of seismic data from one of the remote units R, seismic data as transmitted from the remaining units, either individually or in small groups of units. This process is repeated until the seismic data from each of the remote units R has been transmitted to the master recording unit M. Once seismic data from all the remote units R has been transmitted, the seismic detectors D and remote units R may be moved to other detector stations to collect additional seismic data within the survey area.

When the remote units R are not in use, it is desirable to deactivate the units so that the elements will not drain a power supply 46, which may be a conventional rechargable storage battery. The power supply 46 supplies electrical energy to each of the elements of its associated remote units R except the remote decoder 30, the remote receiver 28 and an energizing generator 48. The remote receiver 28, remote decoder 30 and energizing generator 48 are supplied with electrical energy by a power supply (not shown) which is separate from power supply 46. When one or more of the remote units R is to be deenergized, an energizing generator 22a generates a deenergizing control signal which is conveyed to control coding unit 24 to receive the digital address header coding and command signal coding for this control signal. The coded deenergizing control signal is then conveyed to control transmitter 26 which transmits the deenergizing control signal to the remote units R. The deenergizing control signal is received by the remote receivers 23 in the remote unit R and conveyed to the remote decoders 30. If the deenergizing control signal has an address header coding applicable to the remote unit R with which the remote decoder 30 is associated, the control signal is conveyed to an energizing signal generator 48 operably connected to the remote decoder 30. The energizing signal generator 48 generates a deenergizing command signal which is conveyed to power supply 46 to disconnect the power supply from the remote unit R. When the power supply is disconnected, each of the elements in the remote unit R except for the remote receiver 28, the remote decoder 30 and the energizing generator 48 is disconnected from power supply 46 so that the power supply 46 is not unnecessarily drained. To reenergize the remote unit R, an energizing control signal is generated by a generator 22a, appropriately coded by control coding unit 24, and transmitted to the remote unit by control transmitter 26. Since the remote receiver 28 and the remote decoder 30 have a separate power supply, these units are operable from their own power supply despite the fact that power supply 46 is disconnected. Accordingly, the energizing control signal from master control unit C is received at remote receiver 28, conveyed to remote decoder 30, and further conveyed to energizing generator 48. The energizing generator 48 generates an energizing signal to reconnect the power supply 46 with the remaining components of remote unit R.

There are, of course, additional functions which the master control unit C may perform to further control the operation of the remote units R. For example, the master control unit C may be provided with a master synchronizing signal generator so that the master unit transmits a single pulse signal to each of the remote units R to synchronize the data sampling and storage functions of each of the remote units. In addition, the transmission synchronization signal may be transmitted from the master control unit C to control the rate at which data is transmitted from each of the remote units R.

With or without these modifications, however, the digital seismic telemetry system provides a means for controlling the number of remote units R transmitting seismic data to the master recording unit M so that the amount of data transmitted at any given time may be minimized. Further, the rate at which that seismic data is transmitted from the remote units R to the master control unit M is also controllable and may likewise be minimized. Thus, by reducing the amount of data transmitted at a given time and by reducing the rate at which that data is transmitted, the bandwidth requirement for transmitting the seismic data are substantially reduced.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

What is claim is:

1. A digital seismic telemetry system for recording seismic data from a plurality of spatially separated seismic signal detectors positioned at selected spatially separated detector stations, comprising:

a plurality of remote seismic units, each being positioned at a seismic detector station, and each including;
  remote storage means for storing seismic data from a detector in digital form;
  converter means operably connected to said remote storage means for converting seismic data from a seismic detector into digital form and for supplying the digital seismic data to said remote storage means; and
  remote transmitting means operably connected to said remote storage means for transmitting seismic data from said remote storage means to a master receiver, said remote transmitting means including transmission rate control means, responsive to a signal from a master control means, for controlling the rate at which said remote transmitting means transmits digital seismic data to said master receiver;
master receiver means for receiving transmitted seismic data from each of said plurality of remote seismic units;
master recorder means, operably connected to said master receiver, for recording received data from any of said remote seismic units; and
master control means, including a control transmitting means for transmitting control signals to each of said remote units, for controlling the selection of a remote unit and for controlling the rate of transmission of data from said remote seismic units to said master receiver means, whereby the number of and the transmission rate of said remote seismic units transmitting seismic data to said master receiver means at any given time is controlled.

2. The structure set forth in claim 1, wherein each of said remote converter means further includes:
  an analog to digital converter operably connected to said remote storage means; and
  a floating point amplifier operably connected to said analog to digital converter and to said remote storage means.

3. The structure set forth in claim 1, wherein:
said remote transmitting means includes remote digital coding means operably connected with said remote storage means for coding the seismic data transmitted by said transmitting means;
said master recording means includes master decoder means for decoding seismic data received from any of said remote units; and
master storage means operably connected with said master decoder means for storing seismic data from said master decoder means.

4. The structure set forth in claim 1, wherein: said master control means includes:
  control signal generator means for generating control signals; and
  control transmitter means for transmitting control signals from said control signal generator to said remote units; and
each of said remote units includes:
  remote receiver means for receiving control signals from said master control unit;
  remote command means for generating command signals to control said remote unit in response to and in accordance with a control signal from said master control means;
  control coding means operably connected to said control signal generator means for coding control signals transmitted by said control transmitter means; and
  each of said remote units includes remote decoder means for decoding control signals received by said remote receiver means.

5. The structure set forth in claim 4, wherein said control signal generator means includes:
  sampling signal generating means for generating sampling initiation and cessation control signals for any of said remote units and for generating timing signals for each of said remote units; and
  activation signal generating means for generating remote unit activating and deactivating control signals for any of said remote units.

* * * * *